(12) United States Patent
Littrell

(10) Patent No.: US 8,706,312 B2
(45) Date of Patent: Apr. 22, 2014

(54) CHARGING DEVICE AND METHODS OF AUTHORIZING A CHARGING REQUEST

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 13/152,134

(22) Filed: Jun. 2, 2011

(65) Prior Publication Data

US 2012/0310433 A1      Dec. 6, 2012

(51) Int. Cl.
```
G05D 3/12      (2006.01)
G05D 5/00      (2006.01)
G05D 9/00      (2006.01)
G05D 11/00     (2006.01)
G05D 17/00     (2006.01)
```

(52) U.S. Cl.
USPC .......................................... 700/297; 700/291

(58) Field of Classification Search
USPC ........ 700/291, 297; 705/35, 40, 44, 402, 412;
701/22; 320/101, 104, 107, 109
See application file for complete search history.

(56) References Cited

U.S. PATENT DOCUMENTS

| | | | |
|---|---|---|---|
| 8,019,483 B2 * | 9/2011 | Keefe .............................. | 700/286 |
| 8,100,206 B2 * | 1/2012 | Kressner et al. ............ | 180/65.27 |
| 8,170,699 B2 * | 5/2012 | Kressner et al. ................ | 700/90 |
| 8,332,078 B2 * | 12/2012 | Narel et al. .................... | 700/297 |
| 2008/0281663 A1 * | 11/2008 | Hakim et al. ....................... | 705/8 |
| 2009/0030712 A1 | 1/2009 | Bogolea et al. | |
| 2009/0133733 A1 * | 5/2009 | Retti .............................. | 136/206 |
| 2009/0200988 A1 | 8/2009 | Bridges et al. | |
| 2009/0210357 A1 | 8/2009 | Pudar et al. | |
| 2010/0082464 A1 * | 4/2010 | Keefe .............................. | 705/32 |
| 2010/0256830 A1 * | 10/2010 | Kressner et al. ............... | 700/291 |
| 2010/0292857 A1 * | 11/2010 | Bose et al. .................... | 700/292 |
| 2011/0029144 A1 | 2/2011 | Muller et al. | |
| 2011/0035073 A1 | 2/2011 | Ozog | |
| 2011/0153131 A1 * | 6/2011 | Kressner et al. ................ | 701/22 |
| 2011/0238988 A1 * | 9/2011 | Tanaka et al. .................. | 713/168 |
| 2012/0019205 A1 * | 1/2012 | Kressner et al. .............. | 320/109 |
| 2012/0049795 A1 * | 3/2012 | Dougherty ..................... | 320/109 |
| 2012/0095830 A1 * | 4/2012 | Contreras Delpiano et al. ........................... | 705/14.49 |
| 2012/0116575 A1 * | 5/2012 | Prosser et al. ................. | 700/232 |
| 2012/0229082 A1 * | 9/2012 | Vukojevic et al. ............ | 320/108 |
| 2012/0249065 A1 * | 10/2012 | Bissonette et al. ............ | 320/109 |
| 2012/0253567 A1 * | 10/2012 | Levy et al. ...................... | 701/22 |

* cited by examiner

*Primary Examiner* — Ramesh Patel
(74) *Attorney, Agent, or Firm* — General Electric Company

(57) ABSTRACT

A charging device includes a power delivery system configured to supply power to at least one load coupled to the charging device. The charging device also includes a processor coupled to the power delivery system, and the processor is programmed to transmit a charging request to a remote device. The charging request includes an amount of power requested to be supplied to the at least one load. The processor is programmed to receive data related to a loading of a power distribution device, wherein the power distribution device is configured to supply power to the charging device. The processor is further programmed to selectively activate the power delivery system to supply power to the at least one load based on the data received.

9 Claims, 6 Drawing Sheets

CHARGING DEVICE AND METHODS OF AUTHORIZING A CHARGING REQUEST

BACKGROUND OF THE INVENTION

The present application relates generally to charging devices and, more particularly, to a charging device and methods of authorizing a charging request.

As electric vehicles and/or hybrid electric vehicles have increased in popularity, a corresponding need to accurately manage the delivery of electrical energy to such vehicles has increased. Moreover, a need to provide safe and efficient charging devices or stations has been created by the increased use of such vehicles.

At least some known charging stations include a power cable or another conductor that may be removably coupled to the electric vehicle. More specifically, known charging stations receive electricity from an electric utility distribution network or another electricity source, and supply a metered flow of electricity to the electric vehicle through the power cable.

In at least some electric utility distribution networks, a plurality of charging devices receive electricity from a common electrical distribution component, such as a transformer. Other loads may also receive electricity from the electrical distribution component. However, if each charging device and/or load operates concurrently, the current supplied through the electrical distribution component may exceed a rated current limit of the component. Exceeding the rated current limit may damage the component and/or undesirably cause a circuit breaker or other protective device to interrupt a delivery of power to all charging devices and/or to loads coupled to the electrical distribution component.

BRIEF DESCRIPTION OF THE INVENTION

In one embodiment, a charging device is provided that includes a power delivery system configured to supply power to at least one load coupled to the charging device. The charging device also includes a processor coupled to the power delivery system, and the processor is programmed to transmit a charging request to a remote device. The charging request includes an amount of power requested to be supplied to the at least one load. The processor is programmed to receive data related to a loading of a power distribution device, wherein the power distribution device is configured to supply power to the charging device. The processor is further programmed to selectively activate the power delivery system to supply power to the at least one load based on the data received.

In another embodiment, a power system for use in supplying power to at least one load is provided. The power system includes a charging device configured to generate a charging request representative of an amount of power requested to be supplied to at least one load, and supply power to the at least one load upon a determination that the charging request is authorized. The power system also includes a remote device coupled to the charging device. The remote device includes a processor programmed to receive the charging request and determine a loading of a power distribution device, wherein the power distribution device is configured to supply power to the charging device. The processor is also programmed to determine whether to authorize the charging request based on the determined loading of the power distribution device.

In yet another embodiment, a method of authorizing a charging request is provided. The method includes receiving a charging request from a charging device, wherein the charging request includes an amount of power requested to be supplied to a power storage device of an electric vehicle. The method also includes determining an amount of power supplied by a power distribution device positioned within a distribution path of the charging device, and authorizing the charging request based on the determined amount of power supplied.

DETAILED DESCRIPTION OF THE INVENTION

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
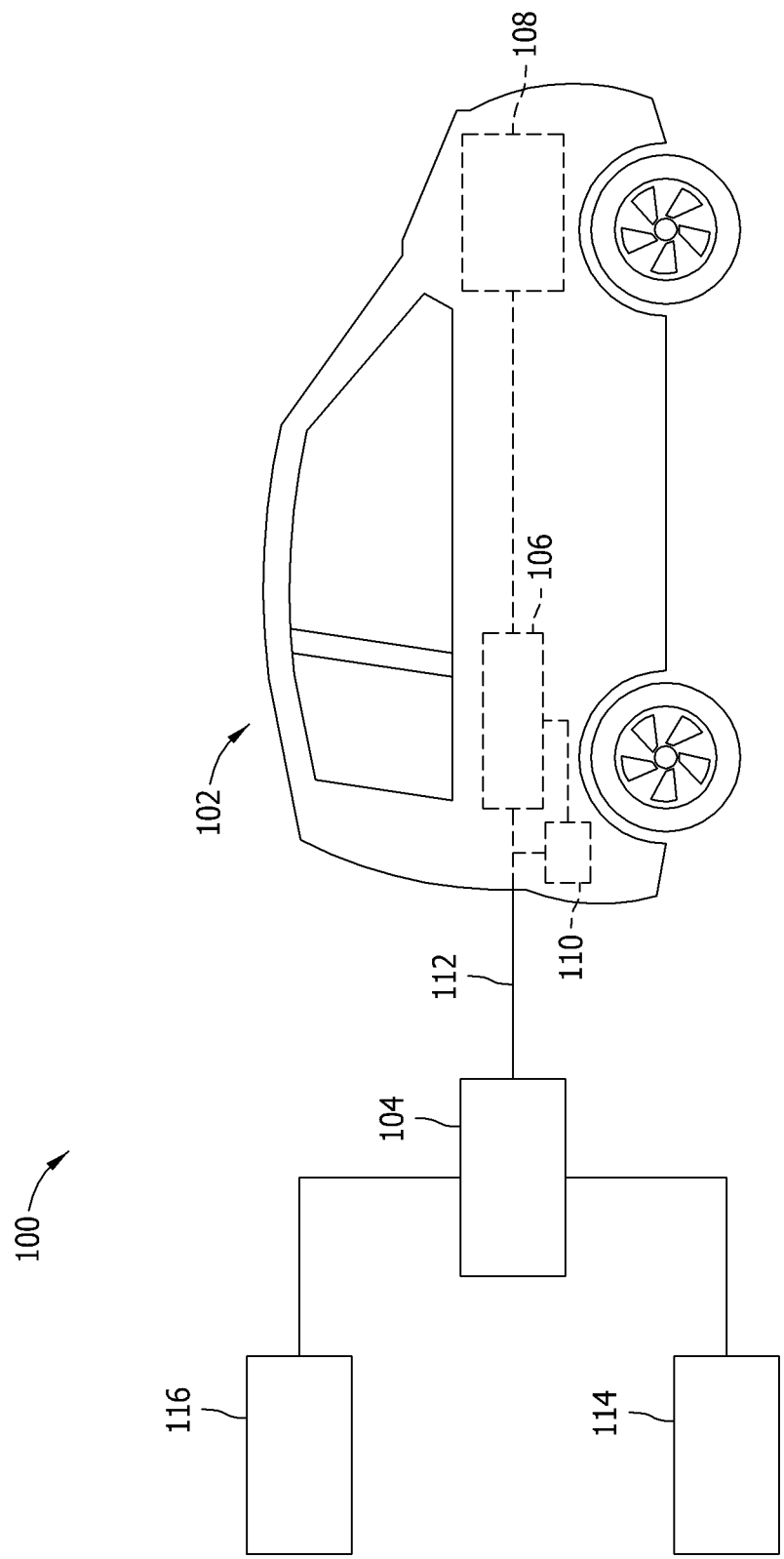
FIG. 1 is a block diagram of an exemplary system for use in charging an electric vehicle.

FIG. 1 illustrates an exemplary system 100 for use in charging, or providing electricity to, a load 102, such as an electric vehicle 102. In the exemplary embodiment, system 100 includes a charging device 104 coupled to electric vehicle 102. In the exemplary embodiment, electric vehicle 102 includes at least one power storage device 106, such as a battery and/or any other storage device, coupled to a motor 108. Moreover, in the exemplary embodiment, electric vehicle 102 includes a vehicle controller 110 coupled to power storage device 106.

In the exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In the exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. Moreover, in the exemplary embodiment, charging device 104 is coupled to an electric power source 114, such as a power grid of an electric utility company, a generator, a battery, and/or any other device or system that provides electricity to charging device 104.

In the exemplary embodiment, charging device 104 is coupled to at least one remote server 116 through a network, such as the Internet, a local area network (LAN), a wide area network (WAN), and/or any other network or data connection that enables charging device 104 to function as described herein. Server 116, in the exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

In the exemplary embodiment, server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During normal operation, in the exemplary embodiment, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 communicates with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and supplies metered power to power storage device 106 through power conduit 112. Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Moreover, charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
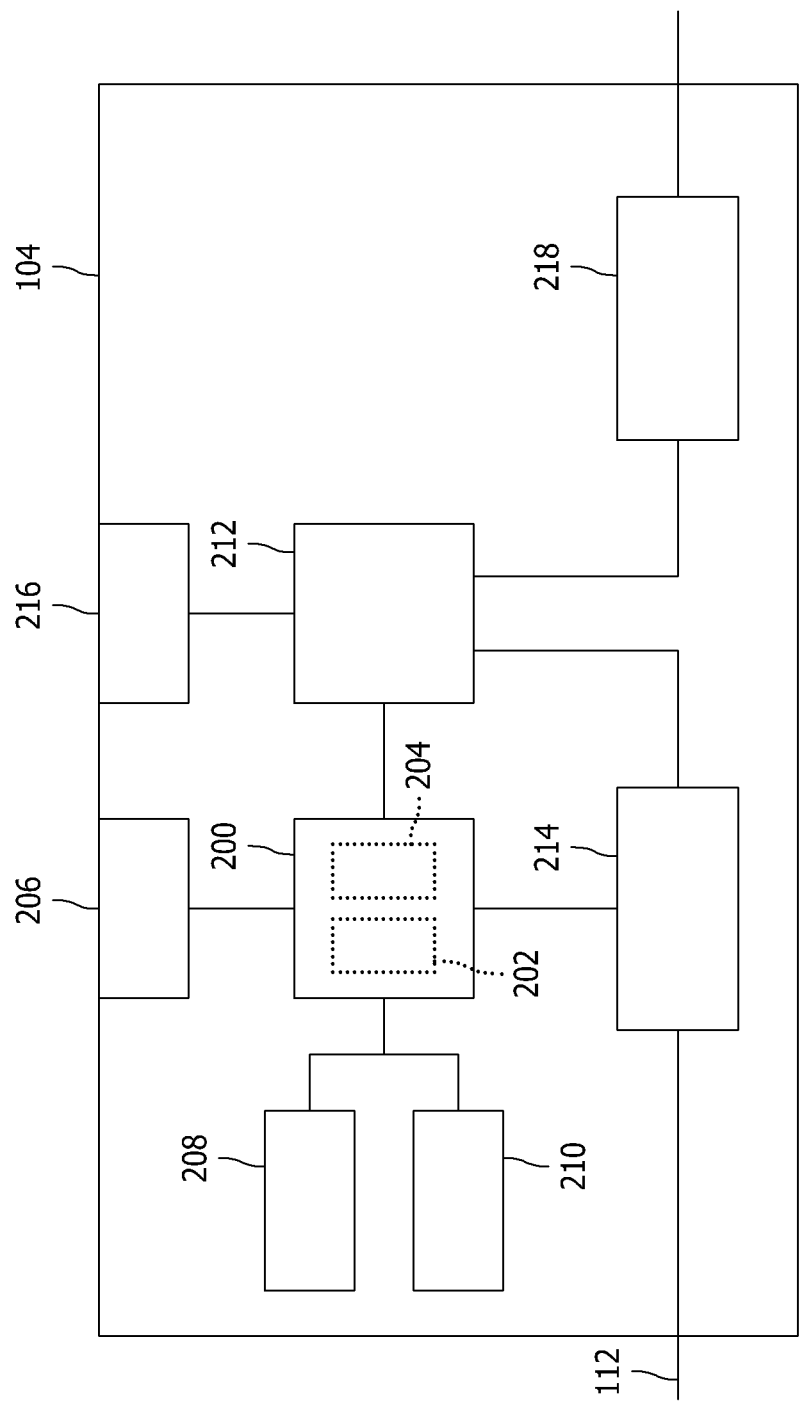
FIG. 2 is a block diagram of an exemplary charging device that may be used with the system shown in FIG. 1.

FIG. 2 is a block diagram of an exemplary charging device 104 that may be used with system 100 (shown in FIG. 1). In the exemplary embodiment, charging device 104 includes a controller 200 that includes a processor 202 and a memory device 204. As described more fully herein, controller 200 is coupled to a network interface 206, to a display 208, to a user interface 210, to a meter 212, and to a power delivery system 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a computer readable medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in the exemplary embodiment, transmits and receives data between controller 200 and a remote device or system, such as server 116 (shown in FIG. 1) and/or any other suitable computer system or device. In the exemplary embodiment, network interface 206 communicates with the remote device or system and with controller 200 using any suitable communication protocol, such as a wireless or wired Ethernet and/or a wireless cellular protocol. Moreover, in the exemplary embodiment, network interface 206 receives at least one signal and/or data from server 116 and/or any other remote device or system to control a power delivery to power storage device 106 and/or to control a startup of charging device 104.

In the exemplary embodiment, display 208 includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In the exemplary embodiment, a charging status of power storage device 106 (shown in FIG. 1), payment information, user authentication information, and/or any other information may be displayed to a user on display 208.

User interface 210 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In the exemplary embodiment, the user may operate user interface 210 to initiate and/or terminate the delivery of power to power storage device 106. In one embodiment, the user may input user authentication information and/or payment information using user interface 210. Moreover, in the exemplary embodiment, a technician or another user may operate user interface 210 and/or another input mechanism (not shown) to control a startup of charging device 104, for example, after charging device 104 has been shut down or restarted. For example, a user may manipulate user interface 210 to select a time (or "start time") to initiate power delivery from charging device 104 after charging device 104 is restarted, and the start time may be transmitted to processor 202 and/or stored within memory device 204.

In the exemplary embodiment, power delivery system 214 is coupled to power conduit 112 and to meter 212. Moreover, in the exemplary embodiment, power delivery system 214 includes a contactor (not shown) coupled to, and controlled by, controller 200. Power delivery system 214 transmits alternating current (AC) power received from electric power source 114 to vehicle controller 110 for use in charging power storage device 106. Alternatively or additionally, power delivery system 214 includes at least one switching device or any other device (not shown) that converts the AC power received from electric power source 114 to direct current (DC) power for use in charging power storage device 106. In the exemplary embodiment, controller 200 operates power delivery system 214, such as by opening the contactor, to interrupt the current flowing through power conduit 112 such that power storage device 106 is electrically disconnected from electric power source 114 (shown in FIG. 1). Moreover, in the exemplary embodiment, controller 200 operates power delivery system 214, such as by closing the contactor, to enable current to flow through power conduit 112 such that power storage device 106 is electrically connected to electric power source 114.

Moreover, in the exemplary embodiment, meter 212 is coupled to power delivery system 214 and to controller 200 for use in measuring and/or calculating the current, voltage, and/or power provided from electric power source 114 to power storage device 106. In the exemplary embodiment, meter 212 is an advanced metering infrastructure (AMI) meter 212 that communicates with an AMI network (not shown) via an AMI interface 216. Moreover, in the exemplary embodiment, AMI interface 216 communicates with at least one system or device via the AMI network using power line communication, communication via twisted pair conductors, radio frequency communication, and/or using any other communication technology or protocol that enables charging device 104 to function as described herein. In the exemplary embodiment, electric power source 114 is coupled to and/or is a part of the AMI network.

A current protection device 218 is coupled to meter 212 and to electric power source 114. Current protection device 218, in the exemplary embodiment, electrically isolates or disconnects charging device 104 from electric power source 114 if the current received from electric power source 114 exceeds a predetermined threshold or current limit. In the exemplary embodiment, current protection device 218 is an electric circuit contactor 218. Alternatively, current protection device 218 may be a fuse, a circuit breaker, a relay, and/or any other device that enables current protection device 218 to function as described herein.

During operation, in the exemplary embodiment, charging device 104 controllably supplies current to electric vehicle 102. More specifically, in the exemplary embodiment, charging device 104 receives current from electric power source 114 and measures the amount of current received via meter 212. Controller 200 determines whether the current should be provided to power storage device 106. In one embodiment, controller 200 receives authorization to provide power to power storage device 106, for example, from a utility system or device via AMI interface 216, from a remote system or device via network interface 206, and/or from any other system or device via any interface that enables charging device 104 to function as described herein. Upon receiving the authorization and/or determining that current should be provided to electric vehicle 102, controller 200 operates power delivery system 214 (e.g., closes the contactor) and the current is transmitted through power conduit 112 to power storage device 106.

Figure 3:
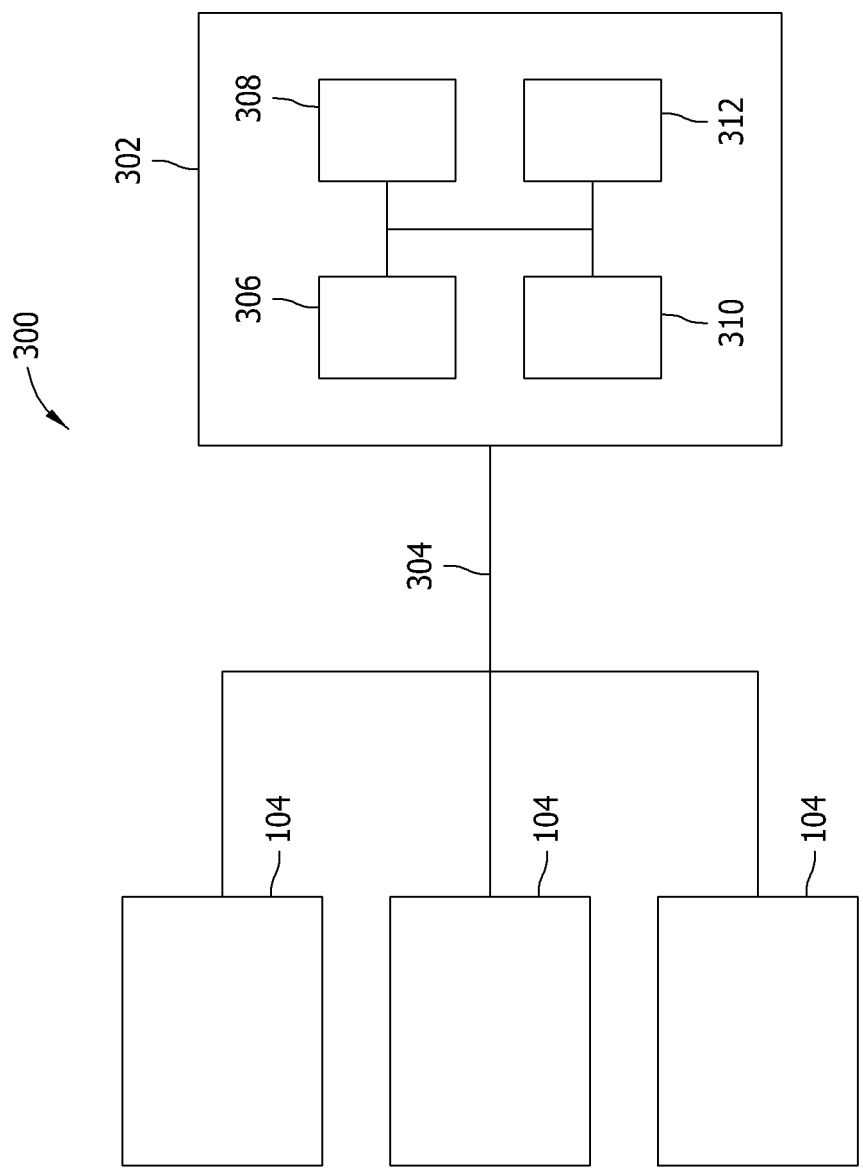
FIG. 3 is a block diagram of an exemplary power system that may be used with the system shown in FIG. 1.

FIG. 3 is a block diagram of an exemplary power system 300 that may be used with system 100 (shown in FIG. 1). In the exemplary embodiment, power system 300 includes a plurality of charging devices 104 coupled to a power distribution device 302 via a network 304.

In the exemplary embodiment, network 304 is a wired network 304 that uses an Ethernet protocol, a power line communication (PLC) protocol, and/or any other wire-based communication protocol that enables power system 300 to function as described herein. In one embodiment, network 304 includes at least one conductor (not shown) that provides a dedicated communication path between each charging device 104 and power distribution device 302. In another embodiment, network 304 includes at least one conductor (not shown) that is used to transmit electrical power from electric power source 114 (shown in FIG. 1) and/or data to each charging device 104 through power distribution device 302 (e.g., using a PLC protocol). In yet another embodiment, network 304 is a wireless network 304 that uses a wireless Ethernet protocol, a cellular protocol, and/or any other wireless protocol that enables power system 300 to function as described herein.

In an alternative embodiment, network 304 is an advanced metering infrastructure (AMI) network 304 that transmits data between charging devices 104 and power distribution device 302 via a plurality of mesh nodes or devices (not shown). Alternatively, data is transmitted through AMI network 304 via any other type of node, device, and/or conduit that enables power system to function as described herein. In other respects, network 304 and/or power system 300 functions as described herein.

Power distribution device 302, in the exemplary embodiment, receives electrical power from electric power source 114 and transmits the power to at least one charging device 104. In the exemplary embodiment, power distribution device 302 is a transformer 302 that adjusts a voltage and/or a current level of the power received from electric power source 114 to a voltage and/or a current level suitable for use with charging device 104. Moreover, in the exemplary embodiment, transformer 302 is a "smart" transformer 302 that includes a processor 306, a memory device 308, a communication device 310, and a meter 312. In the exemplary embodiment, memory device 308, communication device 310, and meter 312 are coupled to processor 306. Alternatively, power distribution device 302 may be any other device that includes processor 306, memory device 308, communication device 310, and/or meter 312 and that is positioned within a distribution path of charging device 104. As used herein, the term "distribution path" refers to an interconnected chain of components, devices, and/or conduits that form an electrical transmission path between electric power source 114 and charging device 104 for use in distributing and/or transmitting electrical power to charging device 104.

Processor 306 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 308 includes a computer readable medium, such as, without limitation, random access memory (RAM), flash memory, a hard disk drive, a solid state drive, a diskette, a flash drive, a compact disc, a digital video disc, and/or any suitable device that enables processor 306 to store, retrieve, and/or execute instructions and/or data.

Communication device 310, in the exemplary embodiment, transmits and receives data between power distribution device 302, charging device 104, and/or any other suitable computer system or device. In the exemplary embodiment, communication device 310 communicates with network interface 206 (shown in FIG. 2) of charging device 104 via network 304.

Moreover, in the exemplary embodiment, meter 312 is coupled to processor 306 for use in measuring and/or calculating the current, voltage, and/or power provided from electric power source 114 to charging device 104. In the exemplary embodiment, meter 312 is an advanced metering infrastructure (AMI) meter 312 that communicates with an AMI network (not shown).

During operation, in the exemplary embodiment, each charging device 104 coupled to power distribution device 302 transmits a request to initiate a charging operation (hereinafter referred to as a "charging request") to power distribution device 302, for example, via network 304. As used herein, the term "charging operation" refers to an operation of charging device 104 wherein electrical power is provided from electric power source 114 and/or power distribution device 302 to a power storage device 106 (shown in FIG. 1) coupled to charging device 104.

In the exemplary embodiment, power distribution device 302 receives the charging request via communication device 310, and communication device 310 transmits the charging request to processor 306. In the exemplary embodiment, processor 306 determines whether to authorize or deny the charging request. More specifically, in the exemplary embodiment, processor 306 receives measurements from meter 312 to determine an amount of power supplied through power distribution device 302 to charging devices 104 and/or to other loads (not shown) coupled to power distribution device 302. Moreover, a predetermined distribution limit of power distribution device 302 is stored within memory device 308. Processor 306 subtracts the amount of power supplied from the distribution limit to determine an available amount of power. If the charging request (i.e., an amount of power requested to be supplied by charging device 104) exceeds the available amount of power such that the overall load anticipated to be presented to power distribution device 302 exceeds the power distribution limit, processor 306 denies the charging request. However, if the charging request does not exceed the available amount of power (i.e., the overall load anticipated to be presented to power distribution device 302 does not exceed the power distribution limit), processor 306 authorizes the charging request. Power distribution device 302 transmits the authorization or denial of the charging request to charging device 104, and charging device 104 selectively provides power to power storage device 106 accordingly.

In an alternative embodiment, processor 306 determines a number of charging devices 104 that are coupled to power distribution device 302 and that are supplying power to at least one power storage device 106. Moreover, processor 306 determines a number of charging devices 104 that power distribution device 302 can supply power to at the same time. More specifically, processor 306 receives a notification, for example, via network 304, from each charging device 104 that is supplying power (hereinafter referred to as "active charging devices 104"). Processor 306 determines the number of active charging devices 104 based on the notifications received. Moreover, in one embodiment, a total number of active charging devices 104 (hereinafter referred to as the "active charging device 104 limit") that power distribution device 302 can supply power to at the same time is stored in memory device 308 and/or in processor 306. The active charging device 104 limit may be determined based on a rated power limit of each charging device 104, based on the power distribution limit of power distribution device 302, and/or based on any other data that enables power system 300 to function as described herein. In the exemplary embodiment, processor 306 subtracts the number of active charging devices 104 from the active charging device 104 limit. If the result is one or greater, power distribution device 302 transmits an authorization or an approval of the charging request to charging device 104 and charging device 104 supplies power to power storage device 106. If the result is less than one, power distribution device 302 transmits a denial of the charging request to charging device 104, and charging device 104 does not supply power to power storage device 106.

In the exemplary embodiment, if charging device 104 receives an authorization or an approval of the charging request, charging device 104 notifies power distribution device 302 that the charging operation has commenced (i.e., that charging device 104 has commenced supplying power to power storage device 106). Once charging device 104 has finished supplying power to power storage device 106, charging device 104 notifies power storage device 106 that the charging operation has completed. Power distribution device 302 updates or re-determines the number of active charging devices 104 based on the notifications received to facilitate maintaining a current charging status of each charging device 104.

Figure 4:
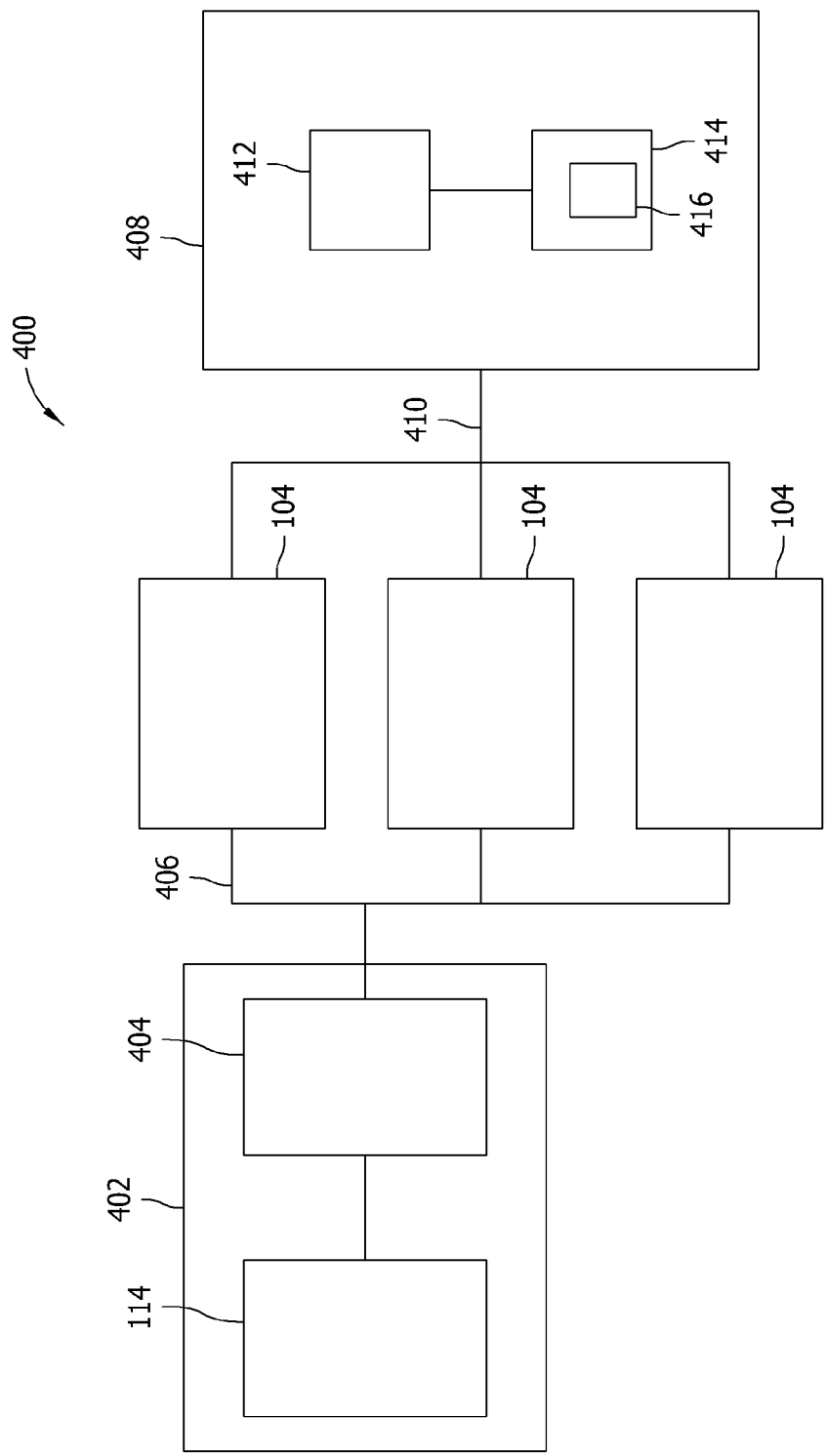
FIG. 4 is a block diagram of an alternative power system that may be used with the system shown in FIG. 1.

FIG. 4 is a block diagram of another exemplary power system 400 that may be used with system 100 (shown in FIG. 1). In the exemplary embodiment, power system 400 includes a power distribution system 402 including at least one electric power source 114 and at least one power distribution device 404. A plurality of charging devices 104 are coupled to power distribution system 402 via at least one power conduit 406. Moreover, in the exemplary embodiment, charging devices 104 are coupled to a server 408 via a network 410.

Power distribution device 404, in the exemplary embodiment, receives electrical power from electric power source 114 and transmits the power to charging devices 104 via power conduit 406. In the exemplary embodiment, power distribution device 404 is a transformer 404 that adjusts a voltage and/or a current level of the power received from electric power source 114 to a voltage and/or a current level suitable for use with charging device 104. Moreover, in the exemplary embodiment, transformer 404 does not include a processor, a memory device, a communication device, or a meter (in contrast to transformer 302 shown in FIG. 3). Alternatively, power distribution device 404 may be any other device that supplies power to charging device 104 and that is positioned within a distribution path of charging device 104.

In the exemplary embodiment, network 410 is an advanced metering infrastructure (AMI) network 410 that transmits data between charging devices 104 and server 408. Alternatively, power system 400 may include any other network 410 that enables system 400 to function as described herein.

In the exemplary embodiment, server 408 includes a processor 412 and a memory device 414 coupled to processor 412. Unless otherwise specified, processor 412 and memory device 414 are substantially similar to processor 306 and memory device 308 (both shown in FIG. 3). Moreover, in the exemplary embodiment, server 408 is positioned within a control room of a utility company (neither shown). Alternatively, server 408 may be positioned in any other location that enables system 400 to function as described herein.

A network model 416, in the exemplary embodiment, is stored and/or is programmed within memory device 414. Network model 416 is a software-based database or representation of components within power distribution system 402, such as electric power source 114 and power distribution device 404. In the exemplary embodiment, network model 416 enables server 408 to identify the topology and/or the interconnections of power distribution system 402 components.

During operation, charging device 104 determines whether to charge (i.e., supply power to power storage device 106) based on a charging status of each other charging device 104 coupled to power distribution device 404. More specifically, in the exemplary embodiment, charging device 104 transmits a charging request (described above with reference to FIG. 3) to server 408 via network 410. In the exemplary embodiment, server processor 412 references, or receives data from, network model 416 to identify power distribution device 404 that is coupled to the requesting charging device 104, and identifies which loads (e.g., other charging devices 104) that are coupled to, and/or that are positioned within the distribution path of, power distribution device 404. Processor 412 receives measurements representative of the power consumed by each load (such as other charging devices 104) coupled to, and positioned in the distribution path of, power distribution device 404, and determines a total amount of power supplied through power distribution device 404 to charging devices 104 and/or to other loads (not shown) coupled to power distribution device 404. In the exemplary embodiment, processor 412 transmits data representative of the total amount of power supplied by power distribution device 404 to charging device 104 for use in determining whether to commence supplying power to power storage device 106.

Moreover, in the exemplary embodiment, a predetermined distribution limit of power distribution device 404 is stored within memory device 204 of charging device 104. Charging device processor 202 subtracts the total amount of power supplied by power distribution device 404 from the distribution limit to determine an available amount of power. If the amount of power requested to be supplied by charging device 104 exceeds the available amount of power, processor 202 prevents charging device 104 from supplying power to power storage device 106. However, if the amount of power desired to be supplied does not exceed the available amount of power, processor 202 causes charging device 104 to supply power to power storage device 106.

In the exemplary embodiment, if charging device 104 commences supplying power to power storage device 106, charging device 104 notifies server 408 that power is being supplied to power storage device 106 (i.e., that the charging operation has commenced). Once charging device 104 has finished supplying power to power storage device 106, charging device 104 notifies server 408 that the charging operation has completed. Server 408 determines a number of active charging devices 104 based on the notifications received to facilitate maintaining a current charging status of each charging device 104.

In an alternative embodiment, charging device 104 transmits a charging request to server 408 via network 410. Server 408 determines whether to approve or deny the charging request. In a similar manner as described above, server processor 412 determines a total amount of power being supplied through power distribution device 404. Moreover, processor 412 subtracts the total amount of supplied power from the power distribution limit to determine the available amount of power. Processor 412 approves the charging request if the available amount of power is greater than, or equal to, the requested amount of power (as identified by the charging request), and denies the charging request if the available amount of power is less than the requested amount of power. Processor 412 transmits the approval or denial of the charging request to charging device 104.

Figure 5:
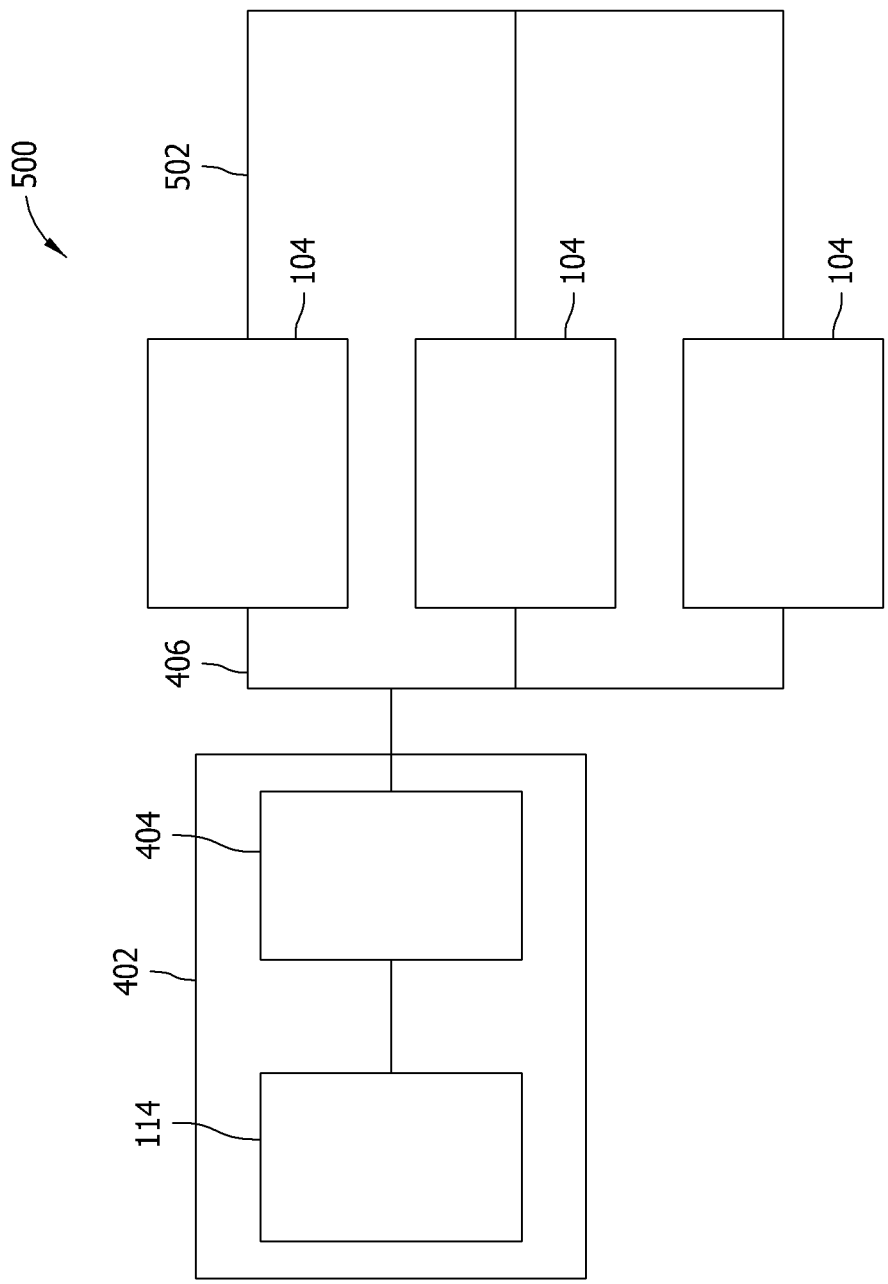
FIG. 5 is a block diagram of yet another alternative power system that may be used with the system shown in FIG. 1.

FIG. 5 is a block diagram of another exemplary power system 500 that may be used with system 100 (shown in FIG. 1). In the exemplary embodiment, power system 500 includes a plurality of charging devices 104 coupled together via a network 502. Moreover, a power distribution device 404 is coupled to each charging device 104 via at least one power conduit 406. Unless otherwise specified, power system 500 is substantially similar to power system 400 (shown in FIG. 4), and similar components are labeled in FIG. 5 with the same reference numerals used in FIG. 4.

During operation, in the exemplary embodiment, charging device 104 does not transmit a charging request to power distribution device 302 (as shown and described above with reference to FIG. 3) or to server 408 (as shown and described above with reference to FIG. 4) when charging device 104 prepares to commence supplying power to power storage device 106 (shown in FIG. 1). Rather, charging device 104 transmits a status request to each other charging device 104 coupled to power distribution device 404. More specifically, in the exemplary embodiment, charging device 104 is programmed with an identity, a network address, and/or any other identifier representative of each other charging device coupled to power storage device 106. Moreover, charging device 104 is programmed with a predetermined maximum number of charging devices 104 that power distribution device 404 is enabled to supply power to at the same time (hereinafter referred to as the "maximum number of active charging devices 104").

Charging device 104 transmits the status request to each other charging device 104 coupled to power storage device 106 via network 502. Each other charging device 104 responds with data representative of a charging status of charging device 104 (i.e., whether charging device 104 is currently supplying power to a power storage device 106 coupled thereto). Charging device 104 determines a number of active charging devices 104 based on the charging status received from charging devices 104. In the exemplary embodiment, if the number of active charging devices 104 is less than the maximum number of active charging devices 104, charging device 104 commences supplying power to power storage device 106. However, if the number of active charging devices 104 is greater than, or equal to, the maximum number of active charging devices 104, charging device 104 does not supply power to power storage device 106. Rather, charging device 104 waits a predetermined time and then submits a new polling request to charging devices 104 to determine if the number of active charging devices 104 has changed. Charging device 104 determines whether to supply power to power storage device 106 as described above.

Figure 6:
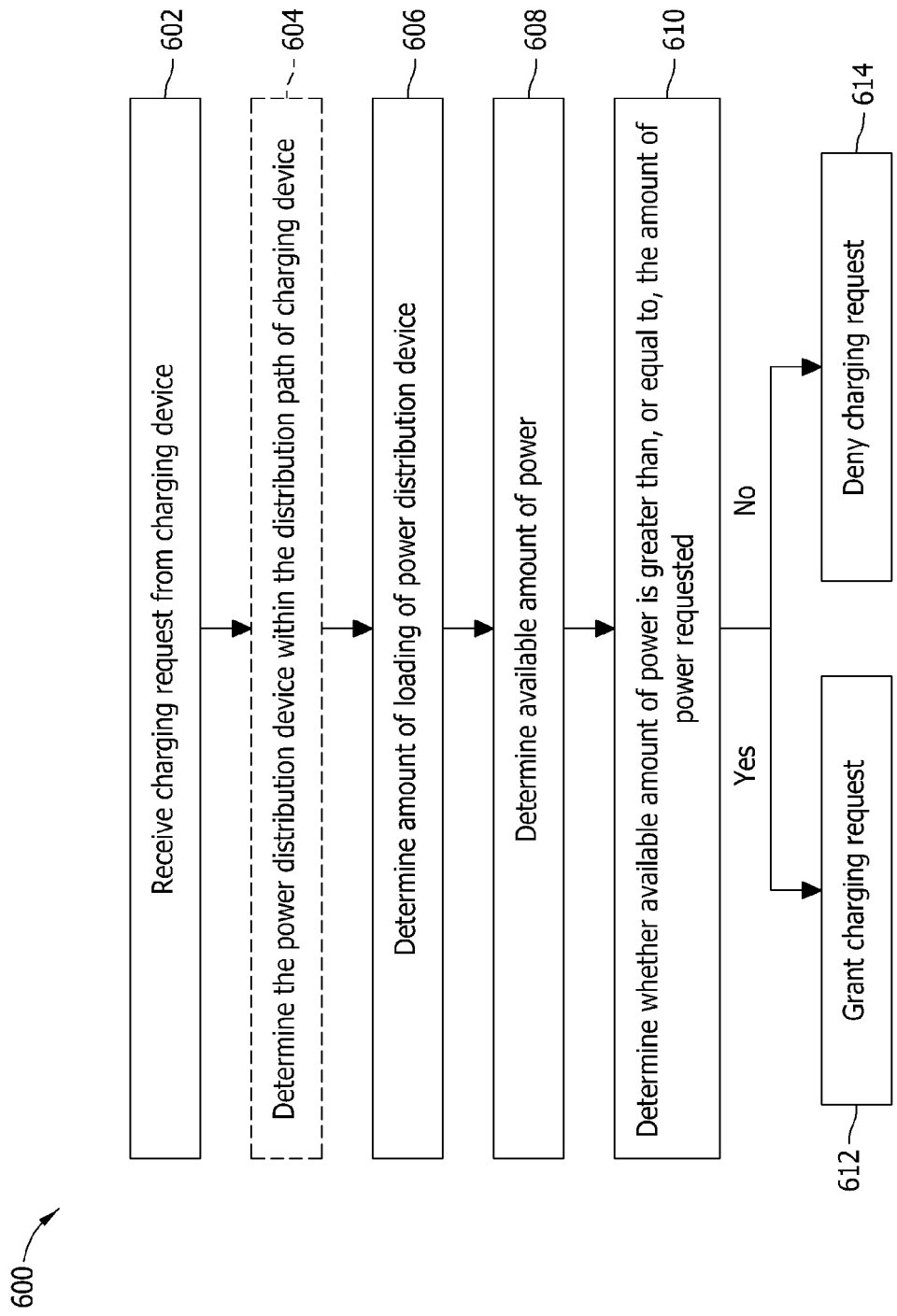
FIG. 6 is a flow diagram of an exemplary method of authorizing a charging request that may be used with the system shown in FIG. 1.

FIG. 6 is a flow diagram of an exemplary method 600 for authorizing a charging request that may be used with charging device 104 and/or system 100 (both shown in FIG. 1). In the exemplary embodiment, method 600 is executed by a processor and/or is embodied within a plurality of instructions stored within a memory device of a system or device remote from charging device 104, such as power distribution device 302 (shown in FIG. 3) or server 408 (shown in FIG. 4).

In the exemplary embodiment, the remote device (i.e., power distribution device 302 or server 408), receives 602 a charging request from charging device 104. Moreover, in the exemplary embodiment, the charging request includes an amount of power that charging device 104 requests to supply to load 102 (shown in FIG. 1) coupled to charging device 104.

In one embodiment, the remote device (e.g., server 408) determines 604 which power distribution device 404 is within the distribution path of charging device 104 (i.e., which power distribution device 404 supplies power to charging device 104). For example, if server 408 receives 602 a charging request from charging device 104, server 408 determines 604 which power distribution device 404 is within the distribution path of charging device 104 by analyzing data received from network model 416 (shown in FIG. 4). However, if charging device 104 transmits the charging request to power distribution device 302 (i.e., power distribution device 302 determines whether to grant or deny the charging request), no determination 604 is required.

In the exemplary embodiment, the remote device determines 606 the amount of loading of power distribution device 404. More specifically, the amount of loading is determined 606 to be an amount of power or current supplied to other loads coupled to, or within the distribution path of, power distribution device 404, as described more fully above with respect to FIGS. 3-5. An available amount of power is determined 608 to be equal to the loading of power distribution device 404 (i.e., the amount of power supplied to other loads) subtracted from the power distribution limit (described above) of power distribution device 404.

The remote device determines 610 whether the available amount of power is greater than, or equal to, the amount of power requested in the charging request. If the available amount of power is greater than, or equal to, the amount of power requested, the remote device grants 612, or authorizes, the charging request and charging device 104 commences supplying the requested amount of power to load 102. In contrast, if the available amount of power is less than the amount of power requested, the remote device denies 614 the charging request, and charging device 104 does not supply the requested amount of power to load 102.

As described herein, the power systems overcome the deficiencies of prior art systems by providing robust and efficient systems and methods to authorize requests to commence charging by a charging device. More specifically, the power systems and methods described herein determine a loading of a power distribution device that is positioned within a distribution path of the requesting charging device. A loading of the power distribution device is determined and an available amount of power able to be supplied by the power distribution device is determined. The charging request is compared to the available amount of power, and the request is granted or denied based on the result of the comparison. Accordingly, the power systems only allow the charging device to supply power to a load if the charging device will not exceed a power distribution capacity of the power distribution device, in contrast with prior art systems that supply power to loads without determining an available amount of power. As such, the power distribution device is facilitated to be operated within the power distribution capacity, thus preventing or minimizing damage or disruption to the power distribution device and/or the power systems.

A technical effect of the systems and methods described herein includes at least one of; (a) receiving a charging request from a charging device, the charging request including an amount of power requested to be supplied to a power storage device of an electric vehicle; (b) determining an amount of power supplied by a power distribution device positioned within a distribution path of a charging device; and (c) authorizing a charging request based on a determined amount of power supplied.

The above-described embodiments provide an efficient and cost-effective power system for use in supplying power to an electric vehicle. A charging device transmits a charging request to a remote device, such as a server or a power distribution device, such as a transformer. The remote device determines an amount of loading induced to the power distribution device and calculates an amount of available power by subtracting the determined amount of loading from a power distribution limit of the power distribution device.

Exemplary embodiments of a charging device and methods of authorizing charging requests are described above in detail. The charging device and methods are not limited to the specific embodiments described herein, but rather, components of the charging device and/or steps of the methods may be utilized independently and separately from other components and/or steps described herein. For example, the charging device may also be used in combination with other power systems and methods, and is not limited to practice with only the electric vehicle as described herein. Rather, the exemplary embodiment can be implemented and utilized in connection with many other power system and/or renewable energy applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power system for use in supplying power to at least one load, said power system comprising:
   a charging device configured to:
      generate a charging request representative of an amount of power requested to be supplied to at least one load; and
      supply power to the at least one load upon a determination that the charging request is authorized; and
   a remote device coupled to said charging device, said remote device comprising a processor programmed to:
      receive the charging request;
      determine a loading of a power distribution device and a power distribution limit associated with the power distribution device, wherein the power distribution device is configured to supply power to said charging device; and
      determine whether to authorize the charging request based on the determined loading of the power distribution device and the power distribution limit associated with the power distribution device.

2. A power system in accordance with claim 1, wherein said remote device is a transformer comprising a processor, said transformer is positioned within a distribution path of said charging device.

3. A power system in accordance with claim 1, wherein said remote device is a server coupled to said charging device by an advanced metering infrastructure (AMI) network.

4. A power system in accordance with claim 1, wherein said remote device is a server is configured to determine a power distribution device that is positioned within a distribution path of said charging device.

5. A power system in accordance with claim 4, wherein said server comprises a network model, said server receives data from said network model to determine the power distribution device that is positioned within the distribution path of said charging device.

6. A power system in accordance with claim 1, wherein the power distribution limit of the power distribution device is stored within said remote device.

7. A power system in accordance with claim 6, wherein said processor compares the loading of the power distribution device to the power distribution limit to determine whether to authorize the charging request.

8. A power system in accordance with claim 6, wherein the loading of the power distribution device is representative of an amount of power distributed by the power distribution device, said processor determines an amount of available power to be equal to the amount of power distributed subtracted from the power distribution limit.

9. A power system in accordance with claim 8, wherein said processor authorizes the charging request based upon a determination that the amount of power requested does not exceed the amount of power available.

* * * * *